United States Patent [19]

Foisy

[11] Patent Number: 5,011,067

[45] Date of Patent: Apr. 30, 1991

[54] METHOD FOR ATTACHING A FUSE WIRE TO A LEAD FRAME

[75] Inventor: Robert L. Foisy, Sanford, Me.

[73] Assignee: Sprague Electric Company, North Adams, Mass.

[21] Appl. No.: 500,351

[22] Filed: Mar. 26, 1990

[51] Int. Cl.⁵ ............................................. B23K 23/00
[52] U.S. Cl. .................................... 228/241; 228/246; 228/179
[58] Field of Search ...................... 228/179, 180.1, 198, 228/241, 242, 246

[56] References Cited

U.S. PATENT DOCUMENTS

| | | | |
|---|---|---|---|
| 1,355,224 | 10/1920 | Gravell | 228/241 |
| 2,146,393 | 2/1939 | Burrell | 228/241 |
| 2,911,504 | 11/1959 | Cohn | 337/296 |
| 2,953,673 | 9/1960 | Bouton et al. | 228/241 |
| 4,107,762 | 8/1978 | Shirn et al. | 361/433 |
| 4,720,772 | 1/1988 | Yamane et al. | 361/433 |

OTHER PUBLICATIONS

IBM Technical Disclosure Bulletin, "Catalyst Soldering of Microcircuits", Mutter, vol. 5, No. 6, pp. 10, 11, Nov. 1962.

IBM Technical Disclosure Bulletin, "Current-Limited Chip Capacitor", vol. 27, No. 4A Sep. 1984, pp. 2026–2027.

Primary Examiner—Sam Heinrich

[57] ABSTRACT

A standard tinned nickel-iron alloy lead frame has a plurality of pairs of extending tab portion positioned in a straight row. A long straight piece of an exothermically alloyable fuse wire, with a core of aluminum coaxially clad with palladium in approximately equal volumes, is held in contact with the plurality of pairs of lead frame tabs. Heat is applied to the fuse strand at two points; namely, on one and the other sides of each pair of tabs initiating progressive alloying in two directions from each heated point. When the progressive alloying and melting of the fuse strand reaches a tab, the tab is heated and heat sinks the fuse strand to stop the progressive alloying and melting. There is simultaneously formed a metallurgical bond between the ends of each remaining elemental fuse strand, respectively, and each of the pair of tabs that are bridged by that remaining elemental strand.

6 Claims, 1 Drawing Sheet

METHOD FOR ATTACHING A FUSE WIRE TO A LEAD FRAME

BACKGROUND OF THE INVENTION

This invention relates to a metal lead frame on which electrical components are to be assembled and more particularly to such a lead frame having attached thereto an exothermically alloyable fuse strand.

It is well known to mount electrical components to lead frames in the manufacture of packaged electrical components. In the U.S. Pat. No. 4,107,762, issued Aug. 15, 1978 and assigned to the same assignee as is the present invention, a method is disclosed by which a lead frame could have been employed for packaging a fused solid electrolyte capacitor including a series connected fuse. The fuse is a short length of a bimetal exothermically alloyable strand connected in the package between the cathode terminal and the cathode of the encapsulated capacitor body.

Such an elemental bimetal strand is described in the U.S. Pat. No. 2,911,504 issued May 15, 1958. One end of the elemental fuse strand is stripped of one of its fuse metal components so that a weld can be made at that one fuse strand end between the cathode terminal and the other fuse metal of that one fuse strand end. The other fuse strand end in this case is soldered to the cathode-counter electrode of the capacitor body. In the making of both joints, care must be taken that the temperature of the fuse strand not exceed that which would initiate exothermic alloying and fusing of the elemental fuse strand. Alternatively, the use of a metal loaded resin is suggested for making these fuse-end connections.

It is an object of this invention to provide a simpler, more reliable method for attaching exothermically alloyable fuse stands to a lead frame.

SUMMARY OF THE INVENTION

According to the method of this invention a patterned sheet metal lead frame has two extending tabs with an open space therebetween and an open space on either side of this one pair of tabs. A bimetal fuse strand, comprised of two separate but mutually adjacent lengths, respectively, of two exothermically alloyable metals, e.g. aluminum and palladium, is held in contact with the two lead frame tabs bridging the space therebetween and extending into the side spaces. Two points on the fuse strand located, respectively, in the one side space and in the other side space are heated to initiate exothermic alloying of the fuse strand at those two points.

This may be accomplished by electrically connecting one output terminal of an electrical energy source directly to the lead frame and either sequentially or simultaneously touching conductors from the other output terminal to those fuse strand points.

Alternatively, the heating may be by laser. The alloying and melting of the fuse strand proceeds along the strand in both directions from each of those points at which the fuse strand is heated. When the alloying reaches each tab, carrying with it a ball of molten alloy (of the same metals composition as the unfused fuse strand), the tab is heated and reduces the temperature of the strand to stop the progression of alloying. At the same time the respective ends of the remaining portion or segment of the fuse strand that bridges the space between the tabs is metallurgically bonded to the tabs.

This metallurgical bond may consist of a weld at the interface of the fuse strand segment end and the tab. However, the hot ball of alloyable fuse-metals may wet the tab surface (and of course wet the fuse strand segment end) and produce a solder bond or a braze bond between the fuse strand segment end and the tab. In the preferred embodiment wherein the fuse strand metals are aluminum and palladium and the lead frame metal is a nickel-iron alloy, the bond tends to consist of both a soldered/brazed bond and a weld.

An electrical device may be attached to a region of the lead frame near each pair of tabs bridged by a fuse strand segment. One terminal of the device (e.g. anode riser wire of a capacitor) is connected to one tab of the pair, which one tab is subsequently severed and disconnected from the lead frame. The other tab serves as the other device terminal (e.g. cathode terminal) that is connected in series with the device, the one tab, a fuse strand segment and one device lead.

The lead frame preferably includes many such pairs of tabs positioned in a straight line. In this case, a long strand of the fuse wire is held in contact with all tabs in this row. After one terminal of the electrical energy source is connected directly to the lead frame, the other electrical energy source terminal may be subsequentially touched to the fuse strand at points in each side space relative to each pair of lead frame tabs.

DESCRIPTION OF THE PREFERRED EMBODIMENTS

Figure 1:
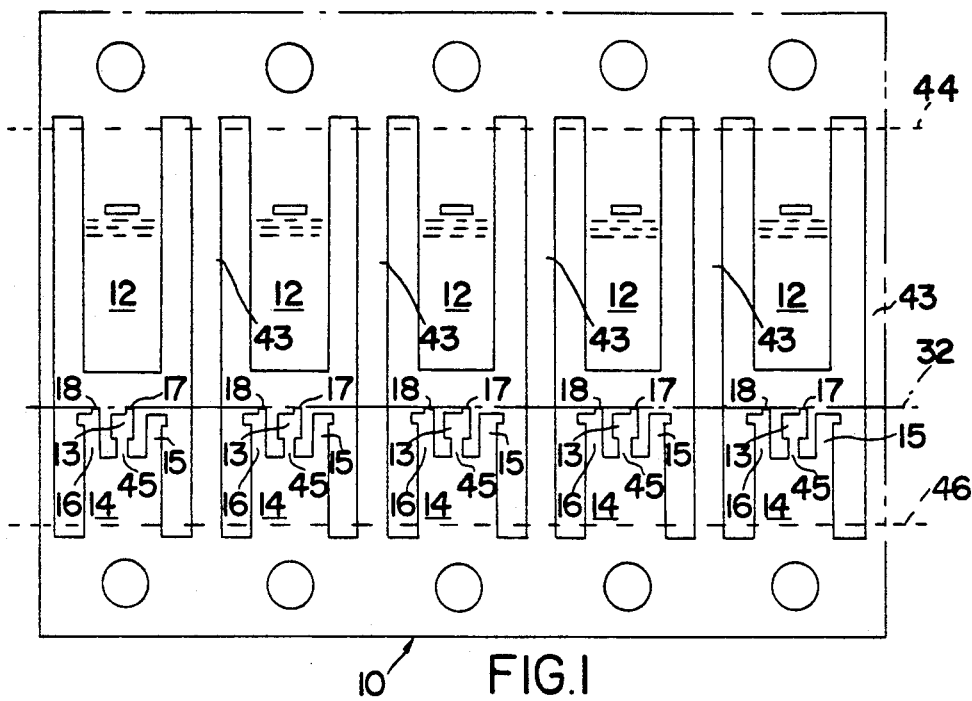
FIG. 1 shows in top view, a lead frame 10 of this invention.

With reference to FIG. 1, the metal lead frame 10 is formed or patterned from a 5 mils (0.13 mm) thick self-supporting sheet metal, by standard means, such as by punching. The sheet metal, of a Hard Alloy 42 (42%Ni56%Fe), first receives a nickel flash and is subsequently electrosolder plated to obtain a 60%Sn40%Pb solder film coating (not shown) of about 0.25 mil (6 microns) thickness.

Figure 2:
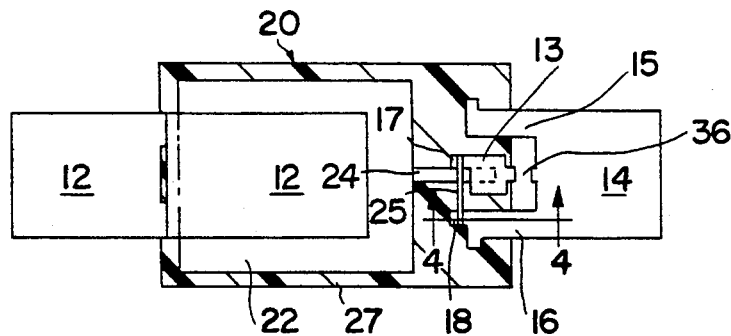
FIG. 2 shows in top view, a package of a solid-electrolyte tantalum capacitor 20 incorporating a portion of the lead frame 10 of FIG. 1 with a fuse wire attached, a portion of the plastic encapsulating material having been removed.

The lead frame 10 is designed for use in the manufacture of solid tantalum capacitor packages, e.g. 20, depicted in FIG. 2. The portion of the lead frame 10 shown in FIG. 1 accommodates five such capacitor packages 20.

Figure 3:
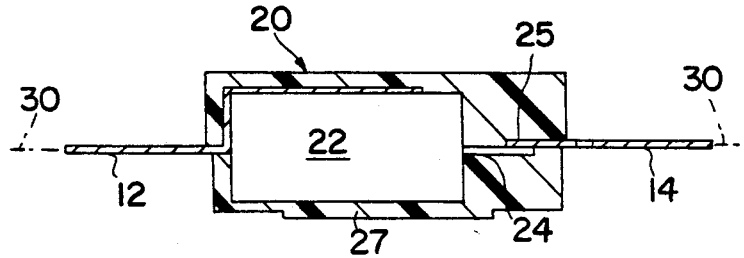
FIG. 3 shows a side view of the capacitor package of FIG. 2 with another portion of the plastic encapsulating material having been removed.

The rectangular (parallelpiped) capacitor body 22 is coated with a solderable material, serving as the capacitor cathode contact. Assembly of the packages begins by conductively bonding each body 22 to one of the cathode terminal portions of lead frame 10, while the capacitor body 22 is positioned so that the distal end of the anode riser wire 24 lies in overlapping flush relationship with an extended anode pad portion 13 of lead frame 10. Each anode pad portion 13 is more precisely an extension of an anode terminal portion 14 of lead frame 10. The riser wires 24 are then percussion-welded to the anode pads 13. The cathode terminal portions 12 have each been bent to engage two faces of the capacitor body 22, to extend from the package 20 in the same plane 30, as shown in FIG. 3, and to permit the flush relationship between riser wire 24 and anode terminal 14.

After the capacitor bodies 22 are all assembled to the lead frame 10, fuse strand segments 25 are then assembled to lead frame 10. With reference to FIG. 2, there is ultimately to be a discrete length or segment 25 of the long start fuse strand connected in series with the anode riser 24 of each capacitor body 22.

How this is accomplished will be understood by first noting that all of the anode terminal portions 14 each have two dog leg portions 15 and 16 that extend away therefrom in the same direction as and on either side of each anode pad portion 13 of lead frame 10. These dog leg extensions 15 and 16 will serve to lock the anode terminals 14 in the capacitor encapsulating plastic 27 of the finished capacitor package 20.

There are two smaller extensions from each anode pad 13 and each dog leg extension 16: namely, tabs 17 and 8, respectively. All tabs 17 and 18 in the lead frame 10 extend in the same direction and lie in a straight line 32. A long straight fuse strand (not shown) is positioned in line 32 and in contact with the many tabs 17 and 18 of lead frame 10. The lead frame tie strips 43 are pushed and bent downward, as seen from the top as in FIG. 1, out of the main plane of the lead frame tabs 17 and 18 so that the fuse strand does not contact these tie strips 43.

Figure 4:
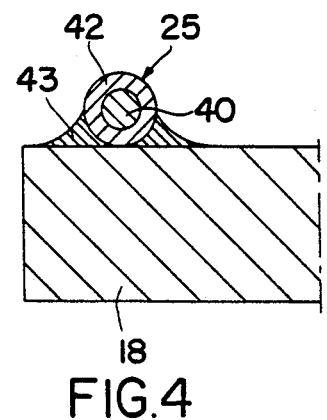
FIG. 4 shows a detail, taken in section 4—4 of FIG. 2, an end portion of the fuse wire and a lead frame tab to which the fuse has been metallurgically bonded.

The fuse strand of 2 mils (0.05 mm) diameter is made up of a core of aluminum 40 that is coaxially clad with an outer jacket of palladium 42, depicted in FIG. 4. When any region of this clad fuse strand reaches a temperature of 650° C. (1200° F.), an exothermic alloying and melting of these two metals is initiated and progressively moves away in both directions. In free air, the temperature of this exothermic alloying reaction reaches on the order of 2800° C. (5000° F.). No oxygen is required for the reaction. The alloying is sustained until the temperature falls below 650° C.

In the following step, a pair of carbon rods electrodes that are connected to the output of an electrical energy source (not shown) are touched to the fuse strand at points (at the X's shown in FIG. 1) in the spaces on either side of each pair of tabs 17 and 18. This has the same effect as, and is equivalent to, connecting one of the output leads from the electrical energy source to any point in the lead frame 10 and touching the points X with one carbon rod that is connected to the other output lead from the electrical energy source. The later approach is preferred so as to provide a more uniform and predictable transfer of electrical energy at each point X along the fuse wire at which exothermic fusing is to be initiated.

The fuse strand exothermically alloys and progressively melts away from each point X in two directions. When the progressive alloying and melting reaches a tab 17 or tab 18, the molten aluminum palladium alloy wets and heats the tab, which reduces the temperature of the fuse wire to stop the alloying and makes a metallurgical bond between the tab 13 and the remaining segment of fuse strand 25. That remaining fuse strand segment 25 is left in the space between each pair of tabs 17 and 18.

FIG. 4 illustrates a resulting joint between tab 18 and fuse strand segment 25, with solidified metal fillets 43 as shown in FIG. 4 of an aluminum palladium alloy. That heating, in the preferred embodiment, effects a true weld between the palladium jacket 42 of the unfused fuse segment 25 with the NiFe tab (17 or 18). Furthermore, the solidified fillet 43, composed of an aluminum palladium alloy, plus, in general, some elemental palladium or aluminum of the very same metals composition, e.g. weight ratio, as that of the unfused fuse strand segment 25, provides a metallurgical bond between the unfused fuse segment 25 and the pad (17 or 18). The metallurgical bond created here in this embodiment between the unfused portion of fuse strand segment 25 and a lead frame tab (17 or 18) consists both of a weld and a solder or braze, whereas either one would be sufficient. Welding, as used herein, provides an interface alloying in the joint between two joined parts and is distinguished from soldering or brazing wherein the joint is dependent upon a fillet material for the connection.

It was noted above that the lead frame tie strips 43 may be pushed downward so that when the straight length of fuse strand is held in contact with all the co-planar extending tab pairs 17 and 18 the fuse strand does not touch the tie strips 43. In this case each pair of adjacent points between adjacent tab pairs at which heating is effected may be merged to one heating point between adjacent tab pairs.

To complete the capacitor package, the lead frame 10, with capacitor bodies 22 and fuse strand segments 25 assembled thereto, is placed in a heated multicavity mold. When closed, a mold cavity contains each capacitor body and associated fuse strand. A liquid plastic or resin molding compound is introduced into the mold cavities to encapsulate each capacitor body and a portion of the lead frame, including the fuse strand. The mold is opened and the lead frame is removed and placed in a fixture.

A piece 45 (FIG. 1) of the lead frame, by which each anode pad 13 is connected to the lead frame 10 is removed using a high speed rotary carbide cutter. Alternatively, piece 45 may be punched away or laser cut away leaving a gap 36 (FIG. 3). Thus each anode terminal portion of lead frame 10 is serially connected via pad 18, fuse strand segment 25 and pad 17 to the anode riser wire 24 of each capacitor body 22.

In a following punching step the lead frame 10 is cut along lines 44 and 46 (FIG. 1) leaving each fused capacitor package 20 independent of the others.

It may be desirable to coat prior to molding and thus surround each fuse strand segment 25 with a material that will more readily disintegrate and/or will have a lower heat conductivity than the molded plastic encapsulant 27. Such considerations are described in more detail in the above-noted U.S. Pat. No. 4,107,762. That patent also describes other combinations of metals that may be combined in an exothermically alloyable fuse of this invention.

Many other approaches to the heating to remove unwanted portions of the fuse strand are possible. For example, a conductive comb or the like may be electrically connected to the other electrical energy source terminal, the tines of the comb may be touched to all such fuse strand points in one step to simultaneously initiate exothermically alloying and melting away the fuse strand in the spaces to the sides of all tab pairs, and metallurgically bonding all remaining fuse strand segment ends to their respective tabs. Initiation of exothermic alloying may also alternatively be effected by irradiating fuse strand points by an infrared laser beam.

The fused lead frame of this invention is intended to be used in combination with many other electrical components than the solid tantalum capacitor described herein. Such other components include other capacitors, diodes, transistors and integrated circuits.

What is claimed is:

1. A method for attaching a fuse wire to a lead frame comprising:
   (a) providing a lead frame having a patterned metallic layer comprised of contiguous parts, two of said parts being a first pair of tabs having one space therebetween and a second and third space on either side thereof;
   (b) positioning a fuse strand across and in contact with said first pair of lead-frame tabs extending into said second and third spaces, said fuse strand comprised of two separate but mutually adjacent lengths respectively of two exothermically alloyable metals; and
   (c) heating points in said fuse strand in said second and third space respectively to initiate exothermic alloying at each said point and to cause the portions of said fuse strand between each of said points and the adjacent one of said first pair of tabs to progressively alloy and melt to carry a hot liquid ball of alloyed fusestrand metal to each of said first-pair tabs where the tab heat-sinks and reduces the temperature of said fuse strand to stop said progressive alloying, and to form a metallurgical connection between an unfused middle segment of said fuse strand and said each of said first-pair tabs leaving the ends of said middle fuse strand segment metallurgically bonded to said first-pair tabs so that said middle segment electrically bridges said first-pair tabs.

2. The method of claim 1 wherein said metallurgical bond is comprised of a true alloy weld between a surface of said unfused middle fuse strand segment and an abutting surface of said tab.

3. The method of claim 1 wherein said metallurgical bond is comprised of a solder or braze connection via a fillet of said alloyed fuse strand material between a surface of said unfused fuse strand portion and an adjacent surface of said tab.

4. The method of claim 1 wherein said two exothermically alloyable fuse- strand metals are palladium and aluminum, respectively.

5. The method of claim 1 wherein said patterned metallic layer is of a nickel-iron alloy.

6. The method of claim 1 wherein said patterned metallic layer is a self-supporting piece of sheet metal, portions of which have been removed to provide the lead frame pattern including said tabs and adjacent spaces.

* * * * *